(12) United States Patent
McCalla

(10) Patent No.: US 7,234,173 B2
(45) Date of Patent: Jun. 26, 2007

(54) HELMET ATTACHMENT APPARATUS AND METHODS

(75) Inventor: Michael B. McCalla, Edwardsville, IL (US)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 11/044,157

(22) Filed: Jan. 26, 2005

(65) Prior Publication Data

US 2006/0162036 A1 Jul. 27, 2006

(51) Int. Cl.
 *A42B 1/24* (2006.01)
(52) U.S. Cl. .............................. 2/422; 2/6.2
(58) Field of Classification Search .................. 2/422, 2/425, 410, 6.2, 209.13; 359/409, 815; 362/105, 362/106, 107; 379/430; 128/201.24; 224/181, 224/930, 909, 271
See application file for complete search history.

(56) References Cited

U.S. PATENT DOCUMENTS

| | | | | |
|---|---|---|---|---|
| 4,270,679 A | * | 6/1981 | Gildea et al. | 224/181 |
| 4,449,787 A | | 5/1984 | Burbo et al. | |
| 4,697,783 A | | 10/1987 | Kastendieck et al. | |
| 4,703,879 A | | 11/1987 | Kastendieck et al. | |
| 4,953,766 A | * | 9/1990 | Cruickshank | 224/181 |
| 5,226,181 A | | 7/1993 | Polednak et al. | |
| 5,265,276 A | | 11/1993 | Kimberly, Jr. | |
| 5,331,459 A | * | 7/1994 | Dor | 359/409 |
| 5,331,684 A | | 7/1994 | Baril et al. | |
| 5,408,086 A | | 4/1995 | Morris et al. | |
| 5,467,479 A | * | 11/1995 | Mattes | 2/6.3 |
| 5,469,578 A | | 11/1995 | Mattes | |
| 5,471,678 A | * | 12/1995 | Dor | 2/6.7 |
| 5,506,730 A | * | 4/1996 | Morley et al. | 359/815 |
| 5,542,627 A | | 8/1996 | Crenshaw et al. | |
| 5,608,919 A | * | 3/1997 | Case | 2/422 |
| 5,914,816 A | | 6/1999 | Soto et al. | |
| 6,472,776 B1 | | 10/2002 | Soto et al. | |
| 2002/0120979 A1 | | 9/2002 | Prendergast | |
| 2006/0072007 A1 | * | 4/2006 | Gilor | 348/61 |
| 2006/0162036 A1 | * | 7/2006 | McCalla | 2/6.2 |

FOREIGN PATENT DOCUMENTS

DE 29813990 U1 10/1998

OTHER PUBLICATIONS

PCT International Search Report and Written Opinion for Application No. PCT/US2006/002254, dated Jun. 19, 2006, 14 pages.

* cited by examiner

*Primary Examiner*—Rodney Lindsey
(74) *Attorney, Agent, or Firm*—Lee & Hayes, PLLC

(57) ABSTRACT

Helmet attachment apparatus and methods are disclosed. In one embodiment, an apparatus for attaching a device to a helmet includes a first shell member coupled to a second shell member by at least one expandable member. The first and second shell members are adapted to approximately conform to first and second surface portions the helmet. When the first and second shell members are engaged with first and second engagement portions of the helmet, the expandable member is tensioned to secure the first and second shell members to the helmet. At least one of the first and second shell members includes a mount adapted to be attached to the device.

19 Claims, 2 Drawing Sheets

US 7,234,173 B2

HELMET ATTACHMENT APPARATUS AND METHODS

FIELD OF THE INVENTION

The present disclosure relates to attachment apparatus and methods for attaching devices to helmets.

BACKGROUND OF THE INVENTION

A driving goal in the aircraft industry is to provide pilots with the best equipment and training possible. Flight helmets are an area of particular importance because they protect the pilot and provide a platform for sensory instruments. Although there are many different types of flight helmets, it is an area where there is room for improvement. For example, helmets come in many different shapes and sizes and require different features for different situations. A situation of particular interest is pilot training. As training fidelity advances, pilots increasingly need to adapt training instrumentation to flight helmets without adversely impacting the helmet integrity. A cost efficient solution to improve the manner in which various sensory instruments may be attached to different helmets would be useful.

SUMMARY OF THE INVENTION

The present invention is directed to helmet attachment apparatus and methods. Apparatus and methods in accordance with the present invention may advantageously provide a stable instrumentation-mounting platform, which is resistant to movement and jitter while not restricting the normal range of movement for the user. Further, embodiments of the invention may accommodate all current helmet sizes and configurations of helmets utilized by pilots, and may provide additional protection to the helmet finish.

In one embodiment, an apparatus for attaching a device to a helmet includes a first shell member coupled to a second shell member by at least one expandable member. The first and second shell members are adapted to approximately conform to first and second surface portions the helmet. When the first and second shell members are engaged with first and second engagement portions of the helmet, the expandable member is tensioned to secure the first and second shell members to the helmet. At least one of the first and second shell members includes a mount adapted to be attached to the device.

BRIEF DESCRIPTION OF THE DRAWINGS

Preferred and alternate embodiments of the present invention are described in detail below with reference to the following drawings.

DETAILED DESCRIPTION

Figure 1:
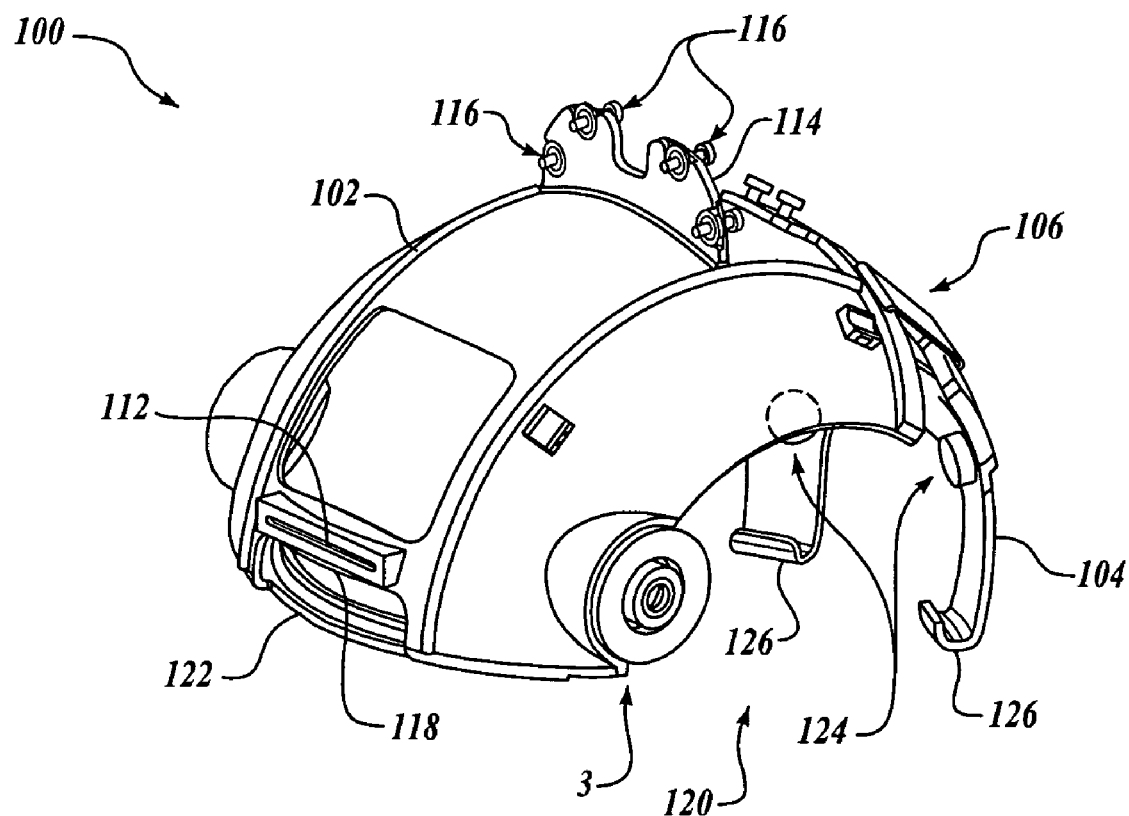
FIG. 1 is a front isometric view of a helmet attachment apparatus in accordance with an embodiment of the present invention.
Figure 2:
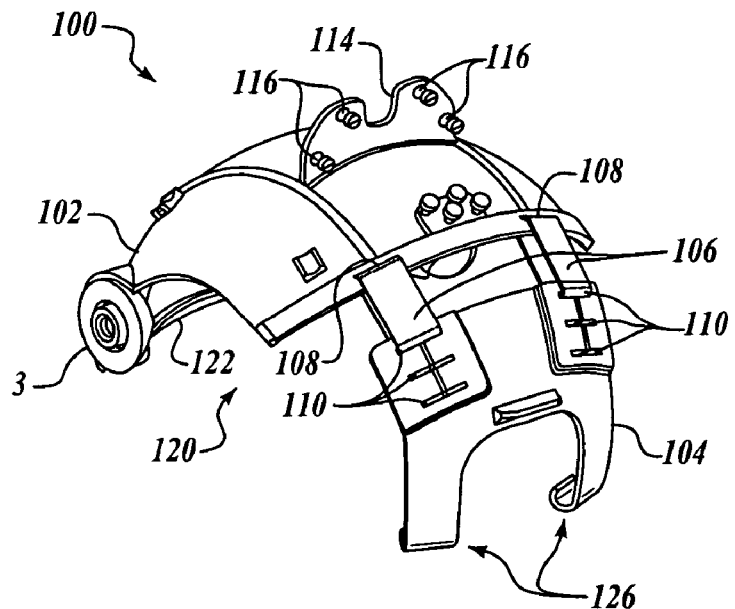
FIG. 2 is a rear isometric view of the helmet attachment apparatus of FIG. 1.
Figure 3:
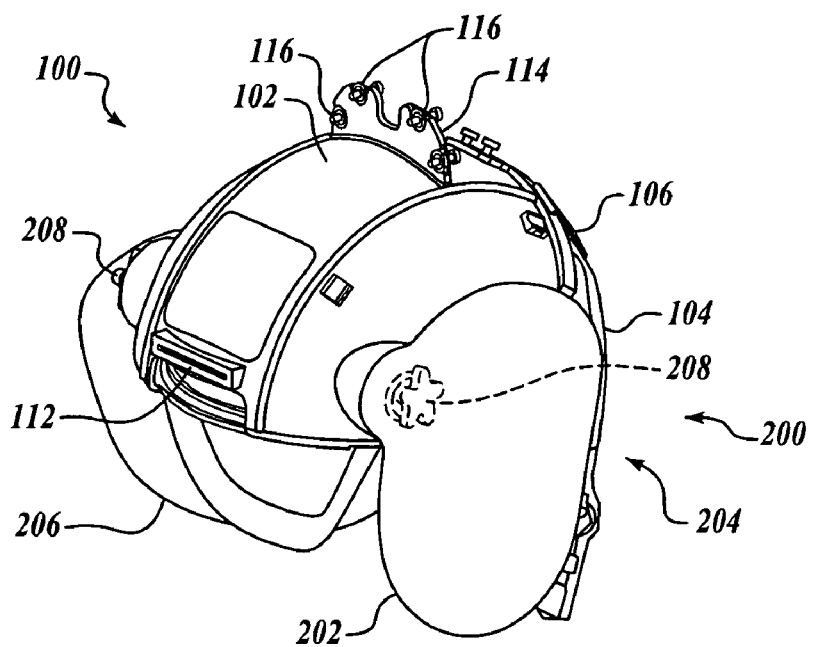
FIG. 3 is an isometric view of a helmet assembly including the helmet attachment apparatus of FIG. 1 coupled to a helmet.

The present invention relates to attachment apparatus and methods for attaching devices to helmets. Many specific details of certain embodiments of the invention are set forth in the following description and FIGS. 1 through 3 provide a thorough understanding of such embodiments. One skilled in the art, however, will understand that the present invention may have additional embodiments, or that the present invention may be practiced without one or more of the details described in the following description.

In general, embodiments of the present embodiment may provide a stable mounting platform for sensory equipment that will not permanently change a helmet. An extra layer of protection for a helmet's finish may also be provided. Embodiments of the present invention may also be easily attached or removed without the use of any extrinsic tools.

More specifically, FIGS. 1 and 2 are front and rear isometric views of a helmet attachment apparatus 100 in accordance with an embodiment of the present invention. In this embodiment, the apparatus 100 includes a first member 102, and a second member 104 coupled to the first member 102 by a pair of expandable members 106. The expandable member 106 may include, for example, an adjustable material (e.g. hook and loop fasteners), an elastic material, or any other suitable expandable or adjustable device. As best shown in FIG. 2, the expandable members 106 are engaged through first slots 108 disposed in the first member 102, and through one of a plurality of second slots 110 disposed in the second member 104. The plurality of second slots 110 enables the helmet attachment apparatus 100 to be adjusted to fit a variety of helmet sizes, as described more fully below. In one particular embodiment, the first and second members 102, 104 may be formed of a nylon material using a Selective Laser Sintering (SLS) process. In alternate embodiments, other materials and manufacturing processes may be used.

As further shown in FIGS. 1 and 2, the first member 102 includes a forward mounting slot 112 and an outwardly-projecting mounting plate 114 having a plurality of attachment points 116 formed therein. The mounting slot 112 and the mounting plate 114 provide multiple mounting locations (or platforms) for sensory equipment, and may advantageously permit instruments to be attached, removed, repositioned, and relocated at a variety of locations on the helmet attachment apparatus 100 without the need for modifying a helmet to which the helmet attachment apparatus 100 is attached. Examples of instruments that may be attached to the helmet attachment apparatus 100 include night vision displays, targeting displays, head tracking sensors, eye tracking sensors, and any other suitable instruments.

Because helmets come in multiple sizes, it would be advantageous to enable the helmet attachment apparatus 100 to be adapted to attach to as many different types of helmets as possible. Thus, in the embodiment shown in FIGS. 1 and 2, the first member 102 includes a pair of first clearance cutouts 118 located in portions of the first member 102 that engage with forward, central portions of the helmet, and a pair of second clearance cutouts 120 (only one visible) located in opposing side portions of the first member 102 that engage with lateral (or side) portions of the helmet. A forward grip member 122 is coupled to the first member 102, and a pair of fitting pads 124 are coupled to the second member 104. In alternate embodiments, additional fitting pads 124 may be added throughout the apparatus 100 at various positions to provide stability as well as protection and tensioning to ensure a secure engagement between the helmet attachment apparatus 100 and the helmet. The gripping member 122 may be flexibly adjustable to accommodate a range of helmet sizes. In one embodiment, the fitting pads 124 and the gripping member 122 are formed of one or more compressible, resilient materials. In addition, the second member 104 includes a pair of engagement hooks 126 that engage lower rear portions of the helmet.

FIG. 3 shows a helmet assembly 200 including the helmet attachment apparatus 100 coupled to a helmet 202. In this embodiment, a transparent visor 206 is coupled to the first member 102 by a pair of attachment devices 208 that threadedly engage with the first member 102. In operation, when the helmet attachment apparatus 100 is being coupled to the helmet 202, the forward grip member 122 engages with a front portion of the helmet. The second member 104 is drawn away from the first member 102, stretching or otherwise extending the expandable members 106 until the engagement hooks 126 slide over and engage with a lower, rear edge 204 of the helmet 202. The fitting pads 124 of the second member 104 then engage against a rear portion of the helmet 202. In some embodiments, the expandable members 106 remain in tension and the fitting pads 124 and the gripping member 122 are compressed against the outer surface of the helmet 202, securely engaging the helmet attachment apparatus 100 to the helmet 202.

The clearance cutouts 118, 120 may advantageously increase the number of helmets that can be effectively used with the helmet attachment apparatus 100 by reducing the surface area of the attachment apparatus 100 that engages with a particular helmet. In addition, the clearance cutouts 118, 120 may also reduce the weight of the helmet attachment apparatus 100 making it more comfortable for a user. Furthermore, because the fitting pads 124 and the gripping member 122 may be formed of a compressible material, they may advantageously avoid scratching of the helmet's outer surface, and may absorb forces applied to the assembly 200 that might otherwise damage or ruin the finish.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A helmet attachment apparatus for attaching a device to a helmet, comprising:
a first shell member coupled to a second shell member by circumferentially spaced expandable members, the first and second shell members being adapted to approximately conform to first and second surface portions the helmet, respectively, the first and second shell members having first and second engagement members adapted to engage with corresponding first and second engagement portions of the helmet such that the expandable member is tensioned to secure the first and second shell members to the helmet, wherein at least one of the first and second shell members includes a mount adapted to be attached to the device.

2. The apparatus of claim 1, wherein the first shell member defines at least one cutout portion adapted to be positioned proximate a forward central portion of the helmet.

3. The apparatus of claim 1, wherein the first shell member defines a pair of opposing lateral cutout portions adapted to be positioned proximate opposing lateral sides of the helmet.

4. The apparatus of claim 1, wherein the expandable member includes at least one of an adjustable material, and an elastic material.

5. The apparatus of claim 1, wherein the first engagement member includes a gripping member adapted to engage a front portion of the helmet, the gripping member being adjustable to accommodate a range of helmet sizes.

6. The apparatus of claim 1, wherein the mount comprises a plate projecting outwardly from the first shell member and including at least one mounting aperture disposed therethrough.

7. The apparatus of claim 1, wherein the mount comprises a slot disposed in the first shell member.

8. The apparatus of claim 1, further comprising a compressible fitting element coupled to the second shell member and adapted to be disposed between the second shell member and the helmet.

9. The apparatus of claim 1, wherein the second engagement member includes at least one hook adapted to couple to an edge portion of the helmet.

10. An assembly, comprising:
a helmet adapted to worn on a head of a user; and
an attachment apparatus for coupling a device to the helmet, the attachment apparatus including:
a first shell member approximately conforming to a first surface portion the helmet and including a first engagement member engaged with a first engagement portion of the helmet; and
a second shell member coupled to the first shell member circumferentially spaced expandable members, the second shell member approximately conforming to a second surface portion of the helmet and including a second engagement member engaged with a second engagement portion of the helmet such that when the first and second engagement members are engaged with the first and second engagement portions, the expandable members is tensioned to secure the first and second shell members to the helmet, and wherein at least one of the first and second shell members includes a mount adapted to be attached to the device.

11. The assembly of claim 10, wherein the first shell member defines at least one of a first cutout portion positioned proximate a forward central portion of the helmet, and a second cutout portion positioned proximate a lateral side of the helmet.

12. The assembly of claim 10, wherein the first engagement member includes a gripping member engaged with a front portion of the helmet, the gripping member being adjustable to accommodate a range of helmet sizes.

13. The assembly of claim 10, wherein the mount comprises at least one of a plate projecting outwardly from the first shell member and including at least one mounting aperture disposed therethrough, and a slot.

14. The assembly of claim 10, further comprising a compressible fitting element coupled to the second shell member and disposed between the second shell member and the helmet.

15. The assembly of claim 10, wherein the second engagement member includes at least one hook coupled to an edge portion of the helmet.

16. A method of coupling a device to a helmet, comprising:
providing an attachment apparatus including a first shell member approximately conforming to a first surface portion the helmet and a second shell member approximately conforming to a second surface portion of the helmet, the first and second shell members being coupled by circumferentially spaced expandable members;
engaging a first engagement member of the first shell member with a first engagement portion of the helmet;

engaging a second engagement member of the second shell member with a second engagement portion of the helmet such that the expandable member is tensioned to secure the attachment apparatus to the helmet; and coupling the device to at least one of the first and second shell members.

17. The method of claim 16, wherein engaging a first engagement member includes engaging a gripping member with a front portion of the helmet, the gripping member being adjustable to accommodate a range of helmet sizes.

18. The method of claim 16, wherein engaging a second engagement member includes compressing a compressible element disposed between the second shell member and the helmet.

19. The method of claim 16, wherein engaging a second engagement member includes engaging at least one hook with an edge portion of the helmet.

* * * * *